Nov. 22, 1932.  J. C. MERWIN  1,888,958

DRUM ROLLER MOUNTING FOR CONCRETE MIXERS

Filed Sept. 13, 1928

INVENTOR.
John C. Merwin
BY Barker & Collings
ATTORNEYS

Patented Nov. 22, 1932

1,888,958

UNITED STATES PATENT OFFICE

JOHN C. MERWIN, OF MILWAUKEE, WISCONSIN, ASSIGNOR TO CHAIN BELT COMPANY, OF MILWAUKEE, WISCONSIN, A CORPORATION OF WISCONSIN

DRUM ROLLER MOUNTING FOR CONCRETE MIXERS

Application filed September 13, 1928. Serial No. 305,760.

This invention relates to drum roller mountings for concrete mixers, and has for one of its objects the provision of a roller assembly for the rotating drums of concrete mixers which will be simple in construction, comparatively inexpensive to manufacture and install, and more efficient in use than those which have been heretofore proposed.

In machines of this character, it is customary to support the mixing drums by resting their outer peripheries upon two pair of spaced rollers which are journalled on transverse shafts carried by the chassis of the mixer. In most cases, the rollers have worked on plain bearings on said shafts, although in a few instances antifriction ball or roller bearings have been used. In all such instances with which I am familiar, however, each roller has been independently mounted on its shaft by means of two antifriction bearings, making four bearings for each shaft, or eight for a mixer. Furthermore, great difficulty has been experienced in providing for the proper lubrication of these bearings, and in preventing sand, cement and water from finding its way into them, with their consequent derangement, and in many cases, their total destruction.

It is one of the principal objects of the present invention to overcome the above difficulties, and to provide a construction in which each pair of rollers is mounted upon its supporting shaft by means of but two antifriction bearings; in which provision is made for effectively excluding sand, cement, water and other harmful matter from said bearings; and in which proper lubrication of the bearings may be easily and effectively maintained.

With the above and other objects in view, which will appear as this description proceeds, the invention consists in the novel details of construction, and combinations and arrangements of parts, more fully hereinafter described, and particularly pointed out in the appended claims.

Referring to the accompanying drawing forming a part of this specification, in which like reference characters designate like parts in all the views:—

Figure 1:
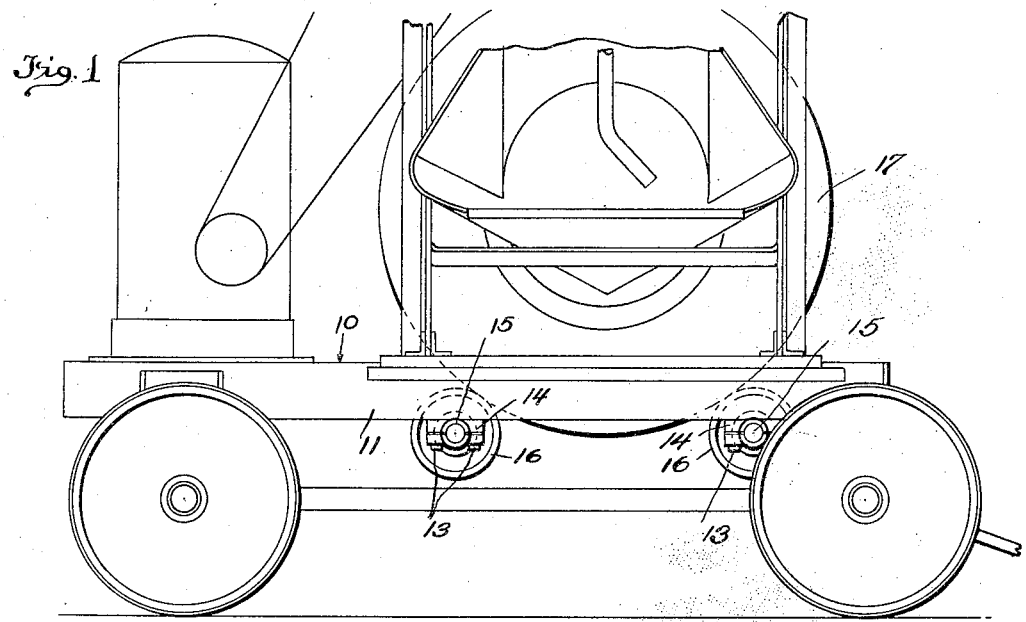
Figure 1 is a fragmentary diagrammatic side elevational view of one well known form of concrete mixer, illustrating the application of the present invention thereto.
Figure 2:
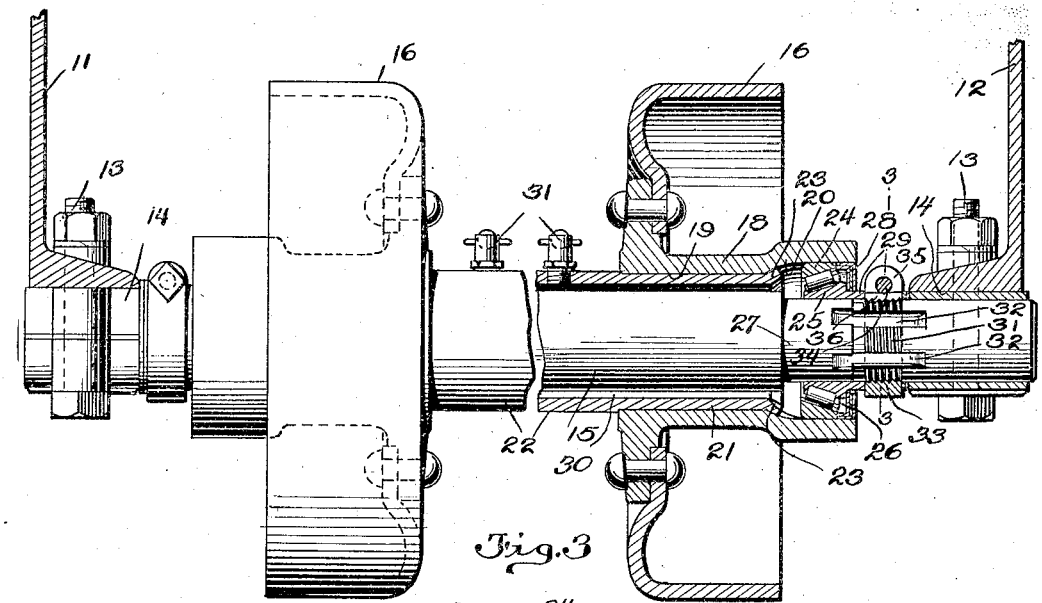
Fig. 2 is an enlarged elevational sectional view, partly broken away, of a drum roller mounting constructed in accordance with this invention.
Figure 3:
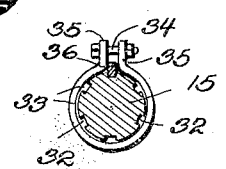
Fig. 3 is a transverse sectional view, taken approximately on the plane indicated by the line 3—3 of Fig. 2.

Referring more particularly to the said drawing, 10 indicates the frame or chassis of the mixer, which includes spaced side channels or members 11 and 12, to which are secured as by the bolts 13, the pillow blocks 14, which receive and hold the extreme end portions of the shafts 15, which support the drum rollers 16. The outer periphery of the mixing drum 17 rests and travels upon the peripheries of these rollers, as will be clear from Fig. 1. The rollers 16 are preferably formed in two parts, as shown in Fig. 2, although obviously they may be made as a single piece if desired. The hubs 18 thereof are provided with a finished bore 19, and a somewhat enlarged counterbore 20, the said bore 19 receiving the finished end portion of a tube or sleeve 22.

The parts are preferably of such dimensions that the end portions 21 of the said tube must be pressed into the bore 19, after which the extreme ends of the tube are spread or flared outwardly as indicated at 23, into the counterbore 20, thereby preventing the hub from backing off of the said tube.

The outer race 24 of an antifriction bearing is pressed into the counterbore 20 of the hub 18, and the inner race 25 and cage 26 of the said bearing are mounted on the reduced end portion 27 of the shaft 15. The fit between the race 25 and the shaft end 27 is preferably a sliding fit, so that the said race may be adjusted, as will presently appear. One or more washers 28 are pressed into the counterbore 20, and coact with an extension 29 of the bearing race 25 to seal the bearing against the entrance of water, sand, cement and the like, and to also prevent the escape of lubricant. The inside diameter of the tube or sleeve 22 is somewhat greater than the diameter of the shaft 15, thereby providing an annular chamber 30 between the two, into which lubricating oil or grease may be introduced through the valved fittings 31. Complete lubrication of the parts may thus be easily and quickly effected.

As shown in Fig. 2, the antifriction bearings employed are preferably of the taper roller type, and in order to provide for adjustment thereof to compensate for wear, the reduced ends 27 of the shaft 15 are threaded, as indicated at 31, and are also provided with a plurality of longitudinally extending keyways 32. A split collar 33, having its inner surface threaded to engage the threads 31, is adapted to be clamped about the said threads by a nut and bolt 34 passing through the ears 35 of the said collar. A key 36 is positioned in one of the keyways 32, and projects into the space between the ears 35, thereby normally preventing rotation of the collar on the shaft. Should it become necessary to adjust the bearing to compensate for wear, by removing the bolt 34 and key 36, the collar 33 may be rotated upon the shaft end 27, and through its threaded engagement therewith, and its engagement with the extension 29 of the inner bearing race 25, will cause the said race to be moved inwardly upon the said shaft, as will be readily understood. The collar will be adjusted to bring the space between its ears 35 in alinement with another of the keyways 32, after which the key 36 and bolt 34 will be replaced, again locking the collar against displacement.

While one form of the invention has been illustrated and described, it is obvious that those skilled in the art may vary the precise details of construction, as well as the arrangement of parts, without departing from the spirit of the invention, and therefore it is not wished to be limited to the above disclosure except as may be required by the claims.

What is claimed is:—

1. A supporting unit for concrete mixer drums, comprising a non-rotative shaft; a sleeve surrounding said shaft; a pair of longitudinally spaced drum supporting rollers rigidly mounted upon said sleeve, provided with counterbored hubs; an adjustable antifriction bearing mounted in the counterbore of each hub, rotatably mounting said rollers and sleeve upon said shaft; and means carried by said shaft for adjusting said bearings.

2. A supporting unit for concrete mixer drums, comprising a non-rotative shaft; a sleeve surrounding said shaft; a pair of longitudinally spaced drum-supporting rollers rigidly mounted upon said sleeve provided with counterbored hubs; an adjustable antifriction bearing mounted in the counterbore of each hub, rotatably mounting said rollers and sleeve upon said shaft; and means comprising threaded collars carried by said shaft and coacting with one of the races of said bearings for adjusting said bearings.

3. A supporting unit for concrete mixer drums, comprising a non-rotative shaft having threaded portions adjacent its ends and a plurality of longitudinal keyways traversing said threads; a sleeve surrounding said shaft; a pair of longitudinally spaced drum-supporting rollers rigidly mounted upon said sleeve; a pair of adjustable antifriction bearings rotatably mounting said rollers and sleeve upon said shaft; a split threaded collar having a pair of spaced ears, mounted upon each threaded portion of said shaft, said collars engaging the inner races of said bearings for adjusting the latter; and a key positioned between the ears of each collar and engaging one of the keyways in said shaft, for normally preventing rotation of said collars.

4. A supporting unit for rotatable receptacles and the like, comprising a tubular sleeve adapted to receive a supporting shaft; and a roller having a bore, mounted upon each end portion of said sleeve with the latter projecting somewhat beyond said bore and flared to retain the roller against displacement, one of the members providing a recess for the reception of an anti-friction bearing for rotatably mounting the unit upon the supporting shaft.

5. A supporting unit for rotatable receptacles and the like, comprising a tubular sleeve adapted to receive a supporting shaft; and a roller mounted upon each end of said sleeve, said rollers having hub portions provided with a bore for receiving said sleeve and a counterbore for receiving an anti-friction bearing for rotatably mounting the unit upon the supporting shaft, the end portions of said sleeve projecting beyond said bores and being flared into said counterbores to retain the rollers against displacement.

In testimony whereof I affix my signature.

JOHN C. MERWIN.